United States Patent [19]
Amemiya

[11] 3,737,797
[45] June 5, 1973

[54] DIFFERENTIAL AMPLIFIER

[75] Inventor: Hiroshi Amemiya, Morrisville, Pa.
[73] Assignee: RCA Corporation, New York, N.Y.

[22] Filed: Mar. 26, 1971
[21] Appl. No.: 128,473

[52] U.S. Cl. .....................330/30 D, 330/51, 307/217
[51] Int. Cl. ..................................................H03f 3/30
[58] Field of Search ............................330/30 D, 151; 307/217

[56] References Cited

UNITED STATES PATENTS

| | | | |
|---|---|---|---|
| 3,551,836 | 12/1970 | Greeson, Jr. | 330/30 D |
| 3,562,660 | 2/1971 | Pease | 330/30 D |
| 3,573,496 | 4/1971 | Lake, Jr. et al. | 330/30 D X |
| 3,597,639 | 8/1971 | Harwood | 330/30 D X |
| 3,597,697 | 8/1971 | Mafarese | 330/30 D X |
| 3,147,446 | 9/1964 | Wittenberg | 330/9 |
| 3,153,196 | 10/1964 | McGuire | 307/217 X |
| 3,541,467 | 11/1970 | Seidel | 330/151 X |
| 3,619,790 | 11/1971 | Brooksbank | 307/217 X |

*Primary Examiner*—Nathan Kaufman
*Attorney*—H. Christoffersen

[57] ABSTRACT

Differential amplifier circuits which can be selectively inhibited from operating upon input signals while maintaining a d.c. operating current in the amplifier, whereby recovery from overloading can be accomplished in relatively short time periods.

8 Claims, 4 Drawing Figures

INVENTOR.
Hiroshi Amemiya
BY
G. Donald Weber, Jr.
ATTORNEY

INVENTOR.
Hiroshi Amemiya
BY
G. Donald Weber, Jr.
ATTORNEY

DIFFERENTIAL AMPLIFIER

BACKGROUND OF THE INVENTION

There are many differential amplifier circuits known in the prior art. The majority of these differential amplifiers are utilized in association with memory devices, although limitation to this type of operation is not suggested. In the known differential amplifiers, it is possible, through a switching network, to inhibit operation of the amplifier circuit insofar as amplification of signals is concerned. However, these differential amplifiers frequently receive large signals which are indicative of the write operation in the memory device. This signal, when applied to the sense amplifier or differential amplifier, even in the non-operating or inhibit mode, causes the input device (e.g., input transistor or the like) to be effectively charged to a condition representative of the write operation. While this condition can be overcome and is not irreversible, a certain finite time duration is required to reverse the condition of the input device. During the condition reversal, the input device is incapable of operating in the appropriate manner to represent proper operation of the differential amplifier circuit. Thus, a write operation signal may temporarily render the circuit inoperable relative to a read operation signal. Moreover, since the read signals are generally of quite small magnitude relative to the write signals, the read signal may be adversely affected or totally destroyed. Also, improper information may be generated as a result of the prior application of the write signal and the consequent precharging of the amplifier input circuit. If the sense signal or read signal is adversely affected in any way, the output from the memory device or the like is also adversely affected and may produce inaccurate information which is supplied to the remainder of the circuit or system. Clearly, this is an undesirable condition and correction thereof is required.

SUMMARY OF THE INVENTION

In the preferred embodiments of the invention, there are shown differential amplifiers which can assume two operating states, namely, the normal operation state and the inhibit state. In the normal operating state, the input signal is operated upon by the amplifier portion of the circuit which produces an appropriate output signal. However, in the inhibit state, amplification of the input signal does not occur and an output signal is not produced. Moreover, a cross-coupled network selectively controls the current in the amplifier circuit and permits a d.c. load current to be maintained in the amplifier circuit regardless of the operating state thereof without affecting the output signal condition.

DESCRIPTION OF THE PREFERRED EMBODIMENTS

Figure 1:
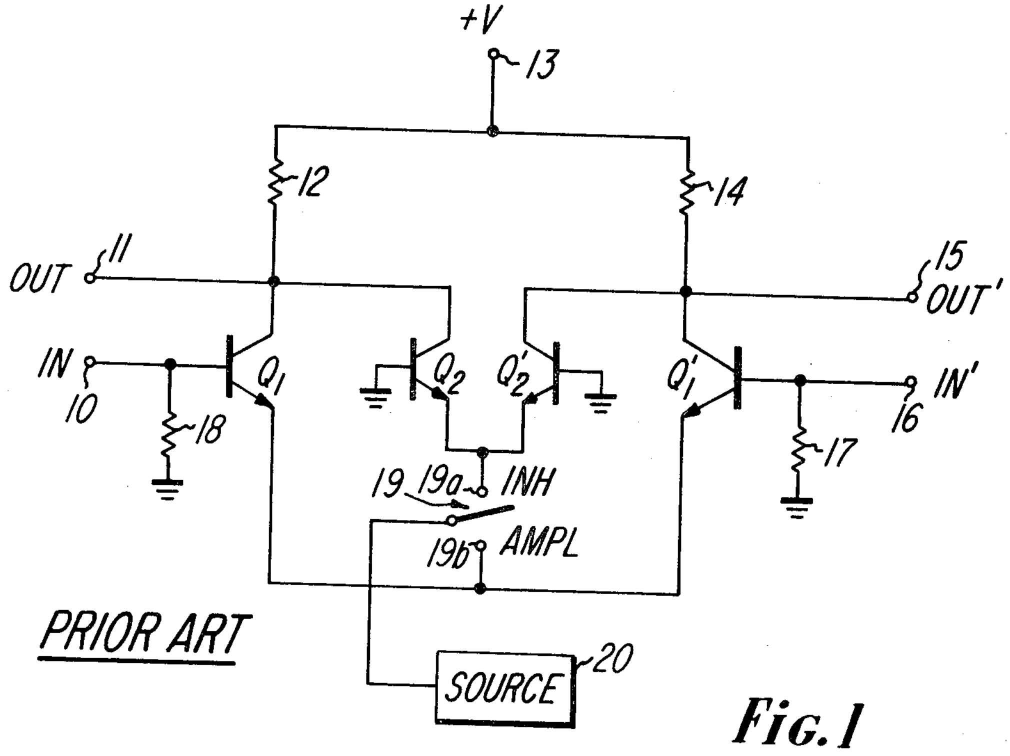
FIG. 1 is a schematic diagram of a differential amplifier known in the prior art.

In the following description, components which are similar in the several drawings bear similar reference numerals.

Referring now to FIG. 1, there is shown a schematic diagram of a differential amplifier which is known in the art. While not necessarily limited thereto, the differential amplifiers described hereinafter may be utilized with memory devices and the like. This illustrative application of the circuits is suggested in order to better understand the operation thereof.

A source +V is associated with terminal 13. Terminal 13 is connected via resistors 12 and 14 to the collector electrodes of transistors Q1 and Q1', respectively. The emitter electrodes of transistors Q1 and Q1' are connected to terminal 19B of switch 19. The movable arm of switch 19 is connected to source 20 which may be a current source or the like. Terminal 19A of switch 19 is connected to the emitter electrodes of transistors Q2 and Q2'. The collector of transistor Q2 is connected to the collector of transistor Q1, while the collector of transistor Q2' is connected to the collector of transistor Q1'. The base electrodes of transistors Q2 and Q2' are each connected to ground or other suitable bias potential. The base of transistor Q1 is connected to terminal 10 to receive the input signal IN. In addition, the base of transistor Q1 is connected to ground or other suitable reference source via bias resistor 18. Similarly, the base of transistor Q1' is connected to terminal 16 to receive the input signal IN'. In addition, the base of transistor Q1' is connected to a suitable reference potential such as ground via bias resistor 17. Output terminals 11 and 15 are connected to the collector electrodes of transistors Q1 and Q1', respectively. The output signal OUT is produced at terminal 11, while the output signal OUT' is produced at terminal 15. In a typical application, the memory device is connected to input terminals 10 and 16. Control apparatus is typically connected to output terminals 11 and 15.

In the circuit shown in FIG. 1, transistors Q1 and Q1' are the amplifying transistors. When the arm of switch 19 is in contact with terminal 19B (i.e., AMPL), the circuit is in the amplification mode. Conversely, when the arm of switch 19 is in contact with terminal 19A (i.e., INH), the circuit is in the inhibit condition. In the inhibit condition, current is depleted from amplifying transistors Q1 and Q1' and diverted to transistors Q2 and Q2'. Clearly, no amplification is possible when the circuit is in the inhibit mode.

When the circuit is in the amplifying mode, i.e., the arm of switch 19 is in contact with terminal 19B, source 20, in conjunction with source +V, supplies current to transistors Q1 and Q1'. Moreover, no current exists in transistors Q2 or Q2' because there is no complete current path associated therewith. Inasmuch as current exists in transistors Q1 and Q1', the input signals supplied to terminals 10 and 16 are amplified. Moreover, since the signals are supplied in the differential amplification mode, the signals supplied to terminal 10 and terminal 16 are approximately equal and opposite in polarity. Due to the good common mode rejection of this type of amplifier, the net input signal is the difference between the signals at terminals 10 and 16. With the application of the input signals, as noted supra, the normal differential amplification operation takes place and the output signals are detected at output terminals 11 and 15. This operation may be considered to be the read operation, wherein the output signals are representative of signals or information which are stored in the memory device or the like.

Conversely, when the arm of switch 19 is in contact with terminal 19A, source 20 is connected to transistors Q2 and Q2' and supplies current thereto. In addition, source 20 is disconnected from transistors Q1 and Q1' whereby there is no current supplied thereto. However, the d.c. potential levels at the collectors are maintained at the same level relative to transistors Q1 and Q1'. If operation of the memory device dictates the application of a WRITE pulse (i.e., to write information in the memory), the WRITE pulse may be supplied to the sense amplifier input as frequently happens. If the WRITE pulse is of the proper polarity, either or both of the input transistors Q1 and Q1' are driven such that the base-emitter junction is conductive. Inasmuch as the WRITE pulse is usually of large magnitude, the transistors are driven hard. With these conditions, the emitter electrodes of transistors Q1 and Q1' are caused to store charge during the duration of the input WRITE pulse. Moreover, the emitter electrodes remain charged even after the termination of the pulse inasmuch as there is no discharge path associated with transistors Q1 and Q1'. Consequently, only when the amplifier circuit is switched back to the amplifying state, i.e., the arm of switch 19 is moved into contact with terminal 19B, can discharge of the emitter electrodes of transistors Q1 and Q1' occur.

Obviously, this discharge would occur only while the circuit was in the amplification mode. Moreover, the discharging process requires a finite time during which the amplifier circuit cannot properly operate. When the amplifier circuit cannot operate properly, output information of questionable integrity is produced and supplied to output utilization devices.

Figure 2:
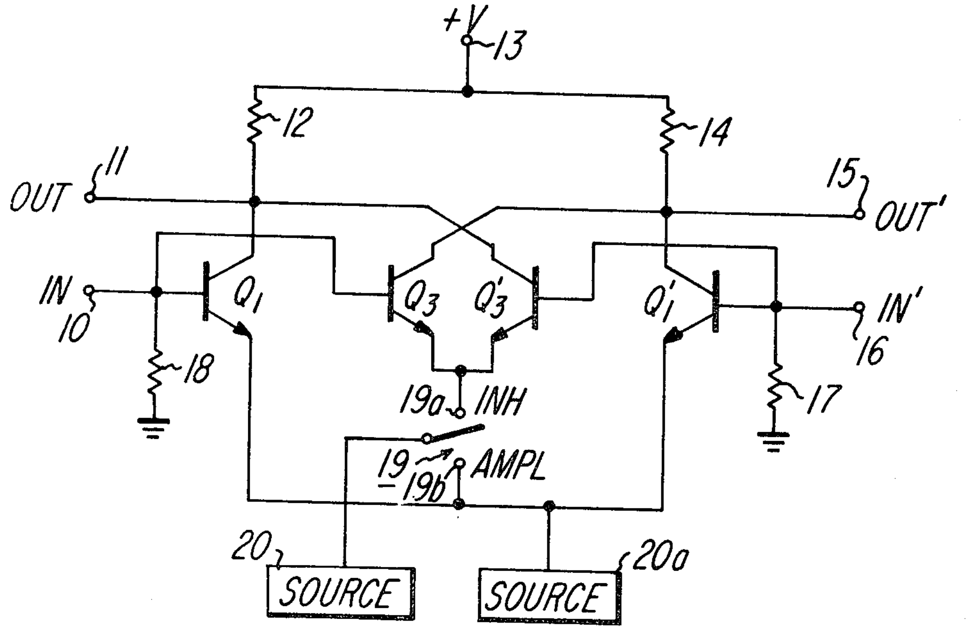
FIG. 2 is a schematic diagram of a cross-coupled differential amplifier which embodies the instant invention.

Referring now to FIG. 2, there is shown a schematic diagram of one embodiment of the instant invention. In this diagram, the circuit is very similar to the circuit shown in FIG. 1. However, the collector electrode of transistor Q3 is connected to the collector electrode of transistor Q1' and the base of transistor Q3 is connected to the base of transistor Q1. Also, the collector of transistor Q3' is connected to the collector electrode of transistor Q1 and the base of transistor Q3' is connected to the base of transistor Q1'. This cross-coupled, current-cancelling network is an important feature of the instant invention. Moreover, source 20A, which is substantially identical to source 20, is connected directly to the common junction of emitters of transistors Q1 and Q1'. Thus, source 20A supplies a continuous current (I) to amplifying transistors Q1 and Q1' regardless of the position of switch 19. In addition, depending upon the position of switch 19, an additional current (I) may be supplied to amplifying transistors Q1 and Q1' or, conversely, this current may be supplied to cross-coupled transistors Q3 and Q3'.

When the arm of switch 19 is in contact with terminal 19B, the current supplied by source 20 is added to the current supplied by source 20A. By definition, the current supplied by each of the sources is I. Thus, when the arm of switch 19 is in contact with terminal 19B, a total current of 2I is supplied to the amplifier portion of the network. Moreover, since transistors Q1 and Q1' are matched transistors, a current I exists in each of transistors Q1 and Q1' in the absence of an input signal. Furthermore, there is no current in transistors Q3 or Q3'. Therefore, normal differential amplification operation by transistors Q1 and Q1' occurs.

Conversely, when the arm of switch 19 is in contact with terminal 19A, a current I is supplied to transistors Q3 and Q3' from source 20. In addition, a current I is supplied to transistors Q1 and Q1' from source 20A. Inasmuch as transistors Q3 and Q3' are matched to each other and to transistors Q1 and Q1', a d.c. current of I/2 is supplied to each of the transistors, again in the absence of an input signal.

Due to good common mode rejection by this type of amplifier, the net input signal supplied to terminals 10 and 16 is the difference between the signals at these terminals. Thus, one-half of the net signal is supplied to the base electrodes of transistors Q1 and Q3, i.e., between the base and emitter electrodes thereof. In addition, the other half of the net input signal is, effectively, applied to the base electrodes of transistors Q1' and Q3' (i.e., between the base and emitter electrodes thereof). Since transistors Q1 and Q3 receive the same input signal at the base thereof, these transistors produce the same collector signal current. Likewise, transistors Q1' and Q3' receive identical input signals and produce the same collector signal currents. The collector signal currents produced by transistors Q1 and Q3 are equal and opposite to the collector signal currents produced by transistors Q1' and Q3'. Because of the cross-coupled connections of the transistors, the collector signal currents produced by transistors Q1' and Q3 cancel. Also, the collector signal currents produced by transistors Q1 and Q3' cancel. Since the collector signal currents cancel each other, the result is a zero signal current at the respective collector electrodes. Obviously, with zero signal current there is no signal amplification by the circuit. Moreover, it is noted that regardless of the position of switch 19 (and the possible lack of signal amplification by the circuit as controlled by the position of switch 19), the d.c. voltage levels at the collector electrodes of the transistors remain the same.

Furthermore, it is seen that the emitter electrodes of the amplifying transistors are continuously connected to source 20A whereby a discharge path is effectively supplied continuously regardless of the position of switch 19. Consequently, in the event that a WRITE signal is applied to an input terminal of the amplifier circuit, when in the inhibit mode, transistors Q1 and Q1' may be rendered conductive, as described in the prior art circuit. However, the charge which was formerly stored in the emitter of the amplifying transistors, is transferred to current source 20A. Consequently, with the termination of the write signal, the amplifying transistors remain conductive and there is no residual charge remaining in the emitters thereof. As a result, by moving the arm of switch 19 into contact with terminal 19B, amplifying transistors Q1 and Q1' are immediately enabled for proper amplifying operation of a sense or read signal so that a correct output signal is supplied at terminals 11 and 15.

Figure 3:
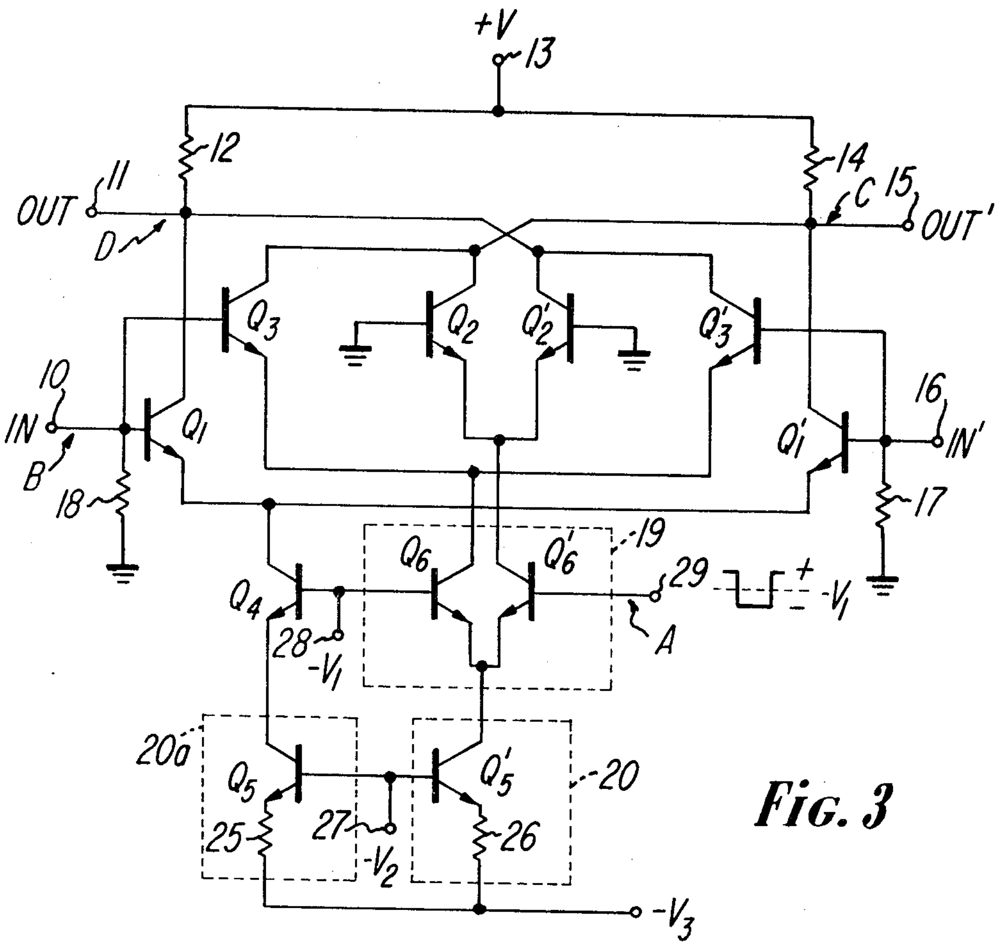
FIG. 3 is a schematic diagram of a cross-coupled differential amplifier with a switching network and shows another embodiment of the instant invention.

Referring now to FIG. 3, there is shown a schematic diagram of another embodiment of the instant invention. Again, in this embodiment, a substantially similar concept is involved. However, in the embodiment shown in FIG. 3 there are three pairs of transistors which are matched to each other. As in the case of the preceding descriptions, transistors Q1 and Q1′ are the amplifying transistors. In the circuit shown in FIG. 3, transistors Q2 and Q2′ are by-pass transistors for by-passing current similar to the like transistors in the circuit of FIG. 1. Moreover, in the circuit shown in FIG. 3, transistors Q3 and Q3′ are the cross-coupled current-cancelling transistors which are substantially similar to the like transistors in the circuit shown in FIG. 2.

Moreover, there is shown a suitable switching and current source circuit. For example, transistor Q5 has the emitter thereof connected to source −V3 via resistor 25. The base of transistor Q5 is connected to a reference or bias potential −V2 at terminal 27. Source −V2 is also connected to the base of transistor Q5′. The emitter of transistor Q5′ is connected, via resistor 26, to source −V3. The transistor Q5 network and the transistor Q5′ network are suitable current source networks, such as the current sources 20 and 20A shown in FIG. 2.

In addition, switch 19 is represented as an electronic switch comprising transistors Q6 and Q6′. The emitters of transistors Q6 and Q6′ are connected together and to the collector of transistor Q5′. The collector of transistor Q6 is connected to the commonly connected emitter electrodes of transistors Q3 and Q3′. The collector of transistor Q6′ is connected to the commonly connected emitter electrodes of transistors Q2 and Q2′. The base of transistor Q6′ is connected to terminal 29 to receive a suitable switching signal (A) which varies between a positive and negative level relative to reference voltage −V1. Reference voltage −V1 is supplied to terminal 28 which is connected to the base of transistor Q6. In addition, source −V1 is connected to the base of transistor Q4. The collector of transistor Q4 is connected to the commonly connected emitters of transistors Q1 and Q1′ while the emitter of transistor Q4 is connected to the collector of transistor Q5.

As suggested, transistors Q5 and Q5′ function as current source networks for the circuit. Transistors Q6 and Q6′ are selectively energized as a function of the signal supplied at terminal 29. Transistor Q4 is included in the network to essentially balance the effects of either transistor Q6 or Q6′, whichever is operative. Transistor Q6′ is rendered conductive when signal A at terminal 29 is positive with respect to reference voltage −V1. Conversely, transistor Q6 is conductive when signal A is negative with respect to reference potential −V1.

Figure 4:
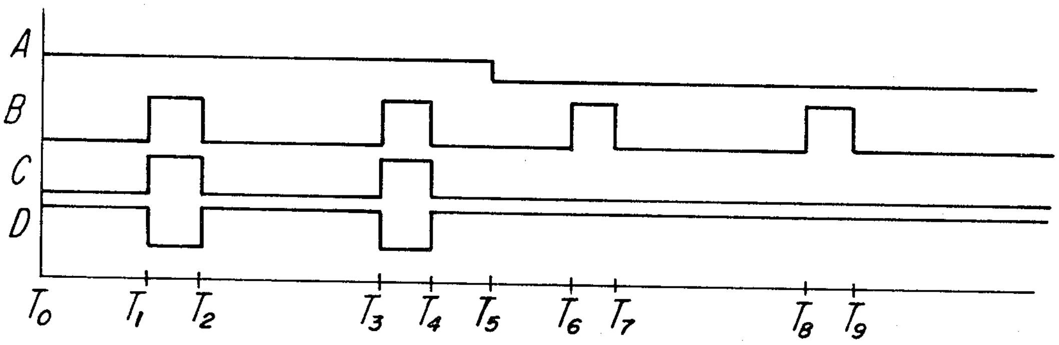
FIG. 4 is a representation of signal waveforms in the circuit shown in FIG. 3.

In describing the operation of the circuit shown in FIG. 3, concurrent reference is made to the waveforms shown in FIG. 4. The waveforms shown in FIG. 4 are designated A, B, C and D and represent the signals provided at the appropriately labelled points in the circuit.

Sources 20 and 20A are each defined to produce a current I. A current I is always supplied, via transistors Q4 and Q5, to the emitters of transistors Q1 and Q1′. Inasmuch as these latter transistors are matched, a current of I/2 is supplied to each of transistors Q1 and Q1′ in the absence of a net input signal.

When signal A is relatively positive with respect to reference voltage −V1, transistor Q6′ is rendered conductive and supplies a current I from transistor Q5′ (source 20) to transistors Q2 and Q2′. Thus, referring to FIG. 4, during time periods T0 through T5, a relatively positive signal A is applied to terminal 29 at the base of transistor Q6′. Thus, a current I is supplied to transistors Q2 and Q2′ concurrently with the application of a current I to transistors Q1 and Q1′. In this condition, transistors Q2 and Q2′ operate as current by-pass transistors, which effectively supply a current of I/2 to each of the load resistors 12 and 14, respectively. Moreover, with the application of input signal B at terminal 10 during time period T1–T2, and because of the differential connection of the input signal, it is clear that transistor Q1′ will be rendered less conductive wherein the potential level at output terminal 15 will be switched to a relatively high level (i.e., approaching +V). Conversely, when transistors Q1 is rendered more conductive by the application of signal B, the potential at D will be diminished toward a voltage level −V3. Of course, the voltage levels mentioned are idealized and are not actually achieved. For example, the application of a relatively positive signal B during time periods T1–T2 causes output signal C to be a relatively positive signal and output signal D to be a relatively negative signal during this same time period.

During time period T2–T3, input signal B switches to ground potential, whereby output signal C becomes less positive inasmuch as transistor Q1′ is rendered more conductive and output signal D becomes more positive inasmuch as transistor Q1 is rendered less conductive. The voltages at C and D have the same value at this time.

Again, at time periods T3–T4 input signal B is a relatively positive signal whereby output signal C is relatively positive and output signal D is relatively negative. This type of operation continues so long as signal A is positive with respect to reference voltage −V1.

At time period T5 input signal A switches to a negative level relative to reference voltage −V1. At this time, transistor Q6′ becomes nonconductive and transistor Q6 is rendered conductive. Consequently, the current I from source 20 is supplied to the emitters of transistors Q3 and Q3′ while transistors Q2 and Q2′ are essentially disconnected from the circuit. With this condition, the by-pass transistors are ineffective and the cross-coupled current-cancelling transistors Q3, Q3′ each receive current I/2, respectively. As noted supra in the discussion relative to FIG. 2, the signal current in transistor Q1 is, effectively, cancelled by an identical but opposing signal current in transistor Q3′. Similarly, the signal current in transistor Q1′ is effectively cancelled by a similar but opposing signal current in transistor Q3. That is, the same d.c. current passes through load resistor 12 and load resistor 14. Consequently, the voltage drops across the load resistors remain unchanged. Moreover, the signal currents at output terminals 11 and 15 are identical wherein a net signal current of zero is produced between the terminals. This condition is suggested by the fact that signals C and D remain substantially constant from time period T5 and thereafter. This condition exists in spite of the fact that signal B switches to the relatively positive level during time periods T6–T7 and T8–T9.

In comparing signals C and D, it is seen that a large gain factor therebetween is exhibited during time periods T1–T2 and T3–T4. However, the gain factor for these signals shrinks to essentially zero during time periods T6–T7 and T8–T9. Thus, in the differential amplifier described herein, in response to a net input signal, there is an output signal when the control signal A is a relatively positive level and there is no output signal when the control signal A is relatively negative.

Thus, there are shown and described differential amplifier circuits which can be selectively inhibited from amplification during a predetermined time period. However, while the differential amplifiers are inhibited from providing an amplification function, the amplifying transistors remain conductive to maintain d.c. currents therethrough. With this arrangement, the amplifying transistors and, thus, the differential amplifier circuit recovers extremely rapidly from any overloading condition which may have been applied, either deliberately or inadvertently, during the inhibit period.

It is to be understood that those skilled in the art may be able to achieve variations and modifications of the instant circuit and circuit concepts. For example, the signal and source polarities in the various circuits may be changed or reversed, which would, of course, require modification of the transistor conductivity types. Moreover, different sources, either potential or current, may be utilized. Furthermore, a different switching configuration may be utilized to control the current sources which are applied to the circuits. In particular, the type of switch is not limitative and may be electronic, mechanical, or the like. Moreover, it may be desirable to fabricate the instant circuits by utilizing integrated circuit techniques or the like. However, the circuits as shown and described are illustrative only and are not meant to be limitative of the invention. Rather, the purview of the invention and the concepts therein are intended to be defined by the appended claims.

What is claimed is:

1. An amplifier responsive to complementary input signals solely in the absence of an inhibit signal, comprising:

first and second input terminals adapted to receive first and second complementary input signals, respectively;

first and second load elements connected to first and second output terminals, respectively;

a first amplification device connected between said first input terminal and said first output terminal;

a second amplification device connected between said second input terminal and said second output terminal;

a third amplification device connected between said first input terminal and said second output terminal;

a fourth amplification device connected between said second input terminal and said first output terminal;

a first current source continuously connected to supply current to said first and second amplification devices;

a second current source; and inhibit signal responsive switch means for coupling said second current source to said third and fourth amplification devices in response to an inhibit signal applied to said switch means, to thereby provide a source of operating current for said third and fourth amplification devices for causing said fourth and third amplification devices to amplify said complementary input signals and to apply them, in amplified form, to said first and second output terminals, respectively, out-of-phase with the signals applied to said first and second output terminals by said first and second amplification devices, respectively.

2. The amplifier recited in claim 1 wherein said first, second, third and fourth amplification devices are, respectively, first, second, third and fourth semiconductor devices each including first and second terminals defining the ends of a conduction path through the device and a control electrode for controlling conduction through said conduction path, said first input terminal connected to the control electrodes of said first and third semiconductor devices, said second input terminal connected to the control electrodes of said second and fourth semiconductor devices, said first output terminal connected to said first terminals of said first and fourth semiconductor devices, said second output terminal connected to said first terminals of said second and third semiconductor devices, said first current source connected to said second terminals of said first and second semiconductor devices, and said second terminals of said third and fourth semiconductor devices connected concurrently to said switch means.

3. The amplifier recited in claim 2 further including fifth and sixth semiconductor devices each having first and second terminals, said first terminals of the fifth and sixth devices being connected respectively to said first and second output terminals, and said second terminals of said fifth and sixth devices being connected to said switch means for selectively connecting either said second terminals of said fifth and sixth semiconductor devices or said second terminals of said third and fourth semiconductor devices to said second current source, said switch means connecting said fifth and sixth semiconductor devices to said second current source solely in the absence of the inhibit signal so that said second current source provides current to said first and second output terminals through said fifth and sixth semiconductor devices, respectively, when said inhibit signal is absent.

4. The amplifier recited in claim 3 wherein each of said fifth and sixth semiconductor devices includes first and second terminals defining the ends of a conduction path through the device and a control electrode for controlling conduction through said conduction path, said control electrodes connected to a reference source, said first terminals of said fifth and sixth semiconductor devices connected respectively to said first and second output terminals, and said second terminals being connected to said switch means.

5. The amplifier recited in claim 1 wherein the magnitude of the current produced by said first current source is substantially equal to the magnitude of the current produced by said second current source.

6. The amplifier recited in claim 2 wherein said first, second, third and fourth semiconductor devices are substantially identical devices integrated upon a common substrate so as to have matched operating characteristics.

7. The amplifier recited in claim 4 wherein said first, second, third, fourth, fifth and sixth semiconductor devices are substantially identical devices integrated upon a common substrate so as to have matched operating characteristics.

8. The amplifier recited in claim 3 wherein said switch means includes a first output terminal connected to said second terminals of said third and fourth semiconductor devices, a second output terminal connected to said second terminal of said fifth and sixth semiconductor devices, a first input terminal connected to a reference source, and a second input terminal receptive of the inhibit signal.

* * * * *